United States Patent [19]
Pedersen

[11] Patent Number: 5,145,588
[45] Date of Patent: Sep. 8, 1992

[54] HIGH BACKWASH FLOW RATE PURIFICATION SYSTEM

[75] Inventor: Paul M. Pedersen, Upper Marlboro, Md.

[73] Assignee: Western Water International, Inc., Forestville, Md.

[21] Appl. No.: 656,700

[22] Filed: Feb. 19, 1991

[51] Int. Cl.$^5$ .............................................. B01D 24/46
[52] U.S. Cl. .................................... 210/793; 210/275; 210/284
[58] Field of Search ............... 210/661, 668, 669, 690, 210/694, 758, 793, 264, 275, 278, 284, 289, 291, 456

[56] References Cited

U.S. PATENT DOCUMENTS

| | | | |
|---|---|---|---|
| 3,554,377 | 1/1971 | Miller | 210/275 |
| 4,102,786 | 7/1978 | Okada et al. | 210/793 |
| 4,659,463 | 4/1987 | Chandler et al. | 210/464 |

Primary Examiner—Bernard Nozick
Attorney, Agent, or Firm—Michael J. McGreal

[57] ABSTRACT

A multiple tank filtration system can be backflushed to remove the material on the loaded adsorbent at a high rate of liquid flow through the use of a tank connecting distributor which has pervious projections extending therefrom into both the first and second tanks. The pervious projections extending into the first tank are less than those which extend into the second tank. This provides for a greater flow of liquid during backwash.

20 Claims, 2 Drawing Sheets

FIG. 1
FIG. 2
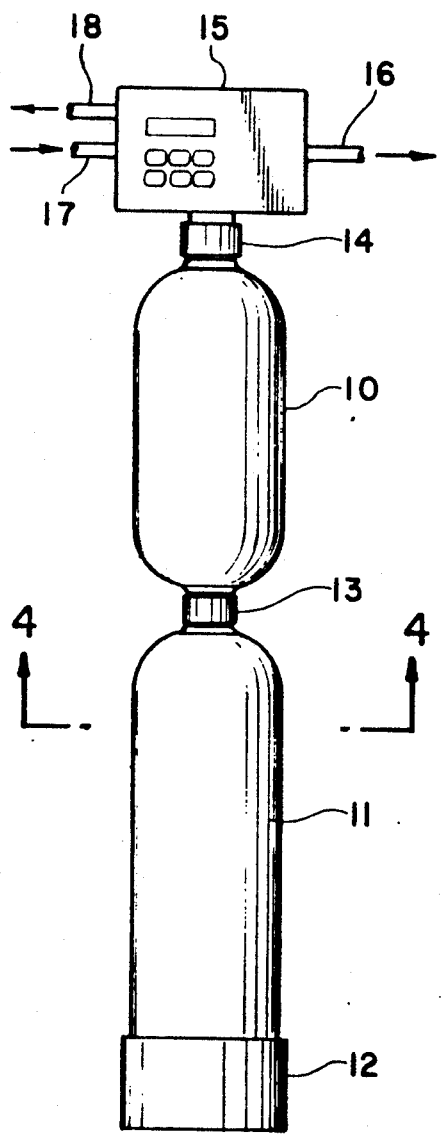
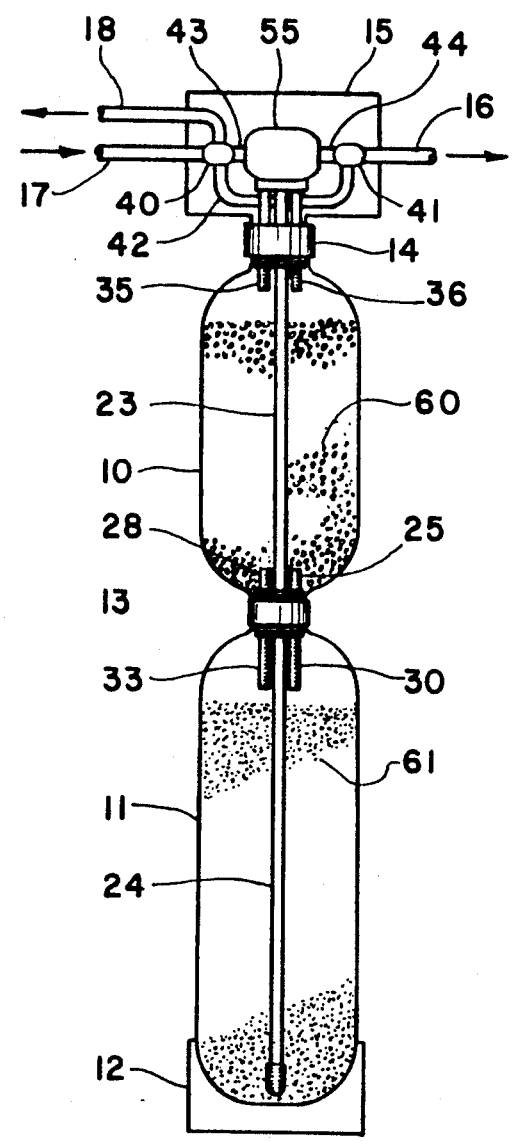

HIGH BACKWASH FLOW RATE PURIFICATION SYSTEM

BACKGROUND OF THE INVENTION

This invention relates to a multiple tank filtration system which permits a high flow backwash. More particularly this invention relates to a filtration system which uses a tank connecting distributor which permits a high flow backwash of the media in the tanks. In addition, this invention relates to a method of regulating the filtration media in multiple tank filtration systems using a high flow backwash.

Most filtration systems consist of a single tank which contains the filtration media. In the instances where more than one type of media is to be used, the media will be layered in the tank. This layering can be with or without a separator membrane. The function of a separator membrane is to maintain the two different media separate and distinct. However, even when a separator membrane is used, there is a problem of maintaining the structural integrity of the filtration medium as during backwash. This is the case since the tanks are usually in a vertical orientation with the input water to be purified flowing downwardly. This serves to compact the media bed. However on backwash, the flow will be upwardly and the media bed will be disturbed. In a high flow backwash a multiple media bed will be disturbed to the extent that the media will become intermixed and generally the more dense media will end up at the bottom of the tank. This is the case even when a separator membrane is used. In some instances the membrane separator can become dislodged and the different media will flow around the membrane separator and become intermixed and at times the separator diverts flow which promotes channeling along the separator and tank walls with the result that the liquid does not effectively contact the media. This will result in a decreased efficiency for the unit.

This problem has been resolved by using a multiple tank system with a novel interconnector distributor. Multiple tank systems are also not known to have high flow characteristics. This is the case since the backwash liquid must be necked down at the tank juncture to flow the liquid from tank to tank. This will be a flow constricting point in the system. However by using the interconnector distributor of the present system, the backwash can be maintained at a high flow rate for a multiple tank system.

An advantage of this system is that a media such as an oxidation-reduction media can be used as the media in the first tank which is the tank into which the liquid flows and an adsorbent media used in the second tank. In this way, the media in the first tank will remove solid microparticles from the input liquid and permit better adsorption in the second tank. Also on backwash the backwash liquid will first contact the relatively cleaner adsorption media at a high flow rate and then the oxidation-reduction media which would contain metallic and other sediments also at a high flow rate. In this way these sediments will not contact and contaminate the adsorption media, but can still be removed from the other media since there will still be a high flow of liquid during backwashing the first tank. If the system contains three tanks the third tank can contain a water softener resin to remove calcium and magnesium ions. It is also an option that the second tank can contain the water softener resin while the third tank contains the adsorption media.

BRIEF SUMMARY OF THE INVENTION

In the filtration of liquids such as water, the present multiple tank systems provide for greater contaminant removal and for a higher backwash flow rate. There are at least two tanks, each containing a filtration media. The media will usually be different in each tank. The multiple tank system comprises at least a first tank and a second tank. A third tank can also be used. Interconnecting the tanks in a two tank system is a distributor which has a plurality of pervious projections extending into the first tank and into the second tank. A similar distributor would be used to interconnect this second tank and third tank. Extending from each side of the distributor and into each tank will be a liquid transport conduit. In the first tank this liquid transport conduit will extend from the distributor through the tank and into the first tank liquid input/output valve. In the second tank in a two tank system this liquid transport conduit will extend to a point adjacent the other end of the tank.

The pervious projections serve to flow water into and out of each tank. By utilizing pervious projections extending into each tank, and in a particular size ratio, the flow rate of liquid can be maximized for both the filtration step and the backwash step. A preferred size ratio is at least about 1.3 times to 1 to about 3 to 1 and most preferably at least about 2 to 1. This is also the preferred pervious surface area ratio of the pervious projections. The pervious projections will extend to a greater extent into the tanks that contain a finer media. A finer media, which is a lighter media, will require a greater pervious projection surface area in order to maintain a high flow rate backwash.

In use, a liquid such as water is flowed into the first tank to remove sedimentation and a first category of contaminants, through the pervious projections extending into the first tank and then into the body of the distributor. The liquid exits the distributor through the pervious projections extending into the second tank. The liquid flows through the media in the second tank, is further purified, or softened in the case of water, and exits the second tank through the liquid transport conduit. The water then flows up through the liquid transport conduit, passing through the distributor, through the liquid transport conduit in the first tank and then to use. During backwash this flow scheme is reversed. The backwash liquid, which will usually be the same as the liquid that has been purified, is flowed through the liquid transport conduit in each tank and through the media in the second tank. The liquid exits the tank through the pervious projections extending into the second tank and passes into the first tank through the pervious projections extending into the first tank. The backwash liquid in passing through the first tank removes sediment and other contaminants from the media in this tank. The backwash is conducted at a high flow rate due to the construction of the distributor which connects the tanks.

Essentially any media can be used in the tanks. However a preferred construction is to have an oxidation-reduction media to remove inorganics in the first tank and a media specific for organics and some inorganics in the second tank. In a third tank there can be a water softener media in the instances when the liquid being purified is water.

BRIEF DESCRIPTION OF THE DRAWINGS

FIG. 1 is an elevational view of a two tank embodiment of the multitank filtration system.

FIG. 2 is a vertical cross-sectional view of the two tank embodiment of FIG. 1.

DETAILED DESCRIPTION OF THE INVENTION

Figure 3:
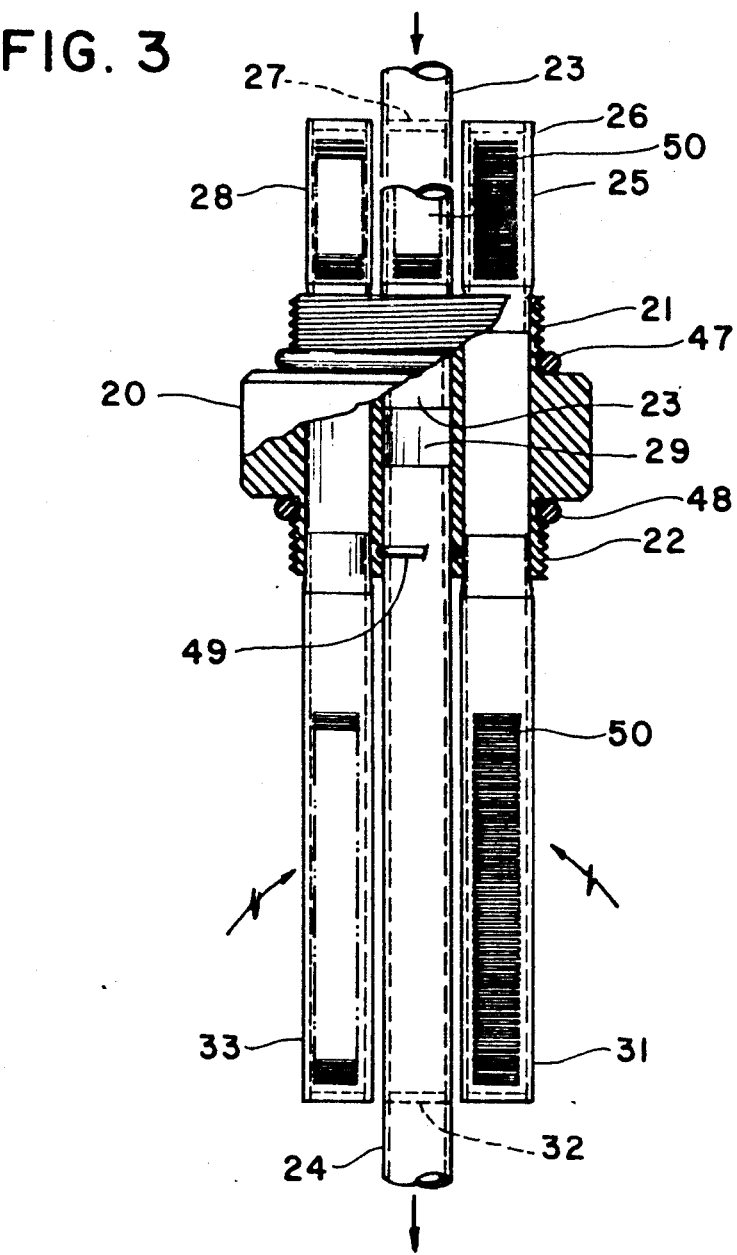
FIG. 3 is an elevational view of distributor which interconnects the tanks.

The present multi-tank system preferably consists of two tanks as is illustrated in FIG. 1. First tank 10 is interconnected to second tank 11 by means of distributor 13. A base 12 supports the tanks and maintains the tanks in a vertical orientation. At the top of the first tank is an inlet/outlet valve 15 which is connected to the first tank by means of distributor 14. A liquid to be purified will flow into valve 15 thorugh conduit 17 with the purified liquid exiting from conduit 16. When the tanks are being backwashed the flow will be in the opposite direction. It will flow in through conduit 17 to the bottom of tank 11. The liquid will then flow upwardly through the second tank, through the distributor and then into and through the first tank exiting at conduit 18. The internal structure of these tanks is shown in more detail in FIG. 2.

In FIG. 2 there is shown the two tank system of FIG. 1 in a vertical cross-section. It is shown that distributor 13 has pervious projections 25 and 28 extending into the first tank and pervious projections 30 and 33 extending into the second tank. There will preferably be at least four pervious projections extending into each tank as is shown in a full view of the distributor in FIG. 3. Extending from adjacent the bottom of the second tank is a fluid transport conduit 24 also known as a riser. This extends up into the distributor. Extending from the distributor to the top of the first tank is fluid transport conduit 23. This fluid transport conduit is sealably connected at the distributor 13 at the lower end and at the inlet/outlet value distributor 14 at the upper end. Extending into the first tank are pervious projections 35 and 36. Shown in the inlet/outlet valve are valves 40 and 41. These can be electrically or manually operated valves. When electrically operated the valves will be controlled by a timer or sensor 55. A sensor could be in the output line 16 and will sense the condition of the liquid being purified and when backwash should start. This can sense the volume that has flowed through the beds or the purity of the effluent liquid. Regardless, a signal will be sent to valves 40 and 41 at the appropriate time to operate these valves. These valves are interconnected by means of conduit 42 for the supply of backwash liquid.

In place of a timer or flow monitor the system can be operated manually. That is, the valves 40 and 41 will be turned manually on say a daily basis to have a period of backwash. The valves will preferably be three or four way valves. Valves 40 is preferably a four way valve and valve 41 a three way valve.

Figure 4:
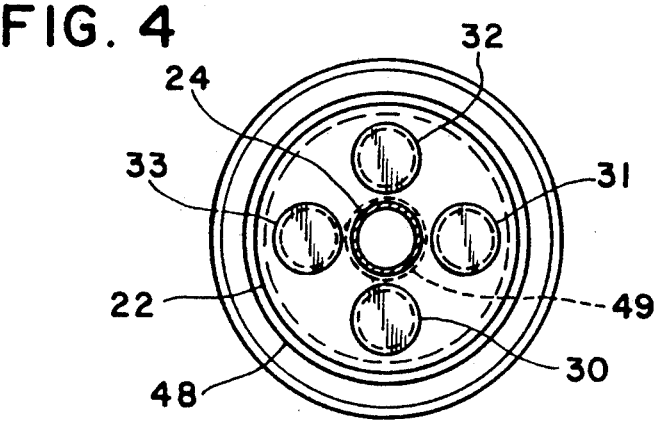
FIG. 4 is a view of the second tank along line 4—4 of FIG. 1.

In FIG. 3 distributor 13 is shown in more detail. This consists of body portion 20 which has threaded sections 21 and 22 on each end. The threaded section 21 extends up into the upper tank and the threaded section 22 extends into the lower tank. O-rings 47 and 48 seal the distributor into the upper tank and lower tank respectively. Threaded section 21 has pervious projections 25, 26, 27 and 28 while threaded section 22 has pervious projections 30, 31, 32, and 33. Each has a plurality of slits 50. Extending from threaded section 21 is liquid transport conduit 23 and from threaded section 22 liquid transport conduit 24. Each of these liquid transport conduits is sealably and releasably connected to the threaded sections. O-ring 49 seals liquid transport conduit 24 into the distributor. The dotted lines 29 denote that there is a conduit in the distributor to flow the liquid directly from one liquid transport conduit to the other liquid transport conduit. FIG. 4 is a cross-section of the second tank and shows the location of the pervious projections and of the liquid transport conduit in more detail. The arrows show the direction of the flow of the liquid during backwash.

The tanks of the system can be of any material that will withstand the operating pressures which range from about 25 pounds per square inch (psi) to about 150 psi. The distributor will be of a plastic which can also withstand the noted pressures. Such plastics are well known materials. At high temperatures and pressures polycarbonate resins can be used for the distributor. The tanks can be constructed of reinforced or unreinforced plastics or of metal. The pervious projections are constructed of plastic and have a plurality of narrow slits through the surface. The slits have a width of about 0.001 inch to about 0.01 inch. The exact size of the slits will be determined by the particle size of the media. The slits must be of a size so that the media will not pass through the slits. Each slit will extend about 1/5 to ¼ around the circumference of a pervious projection. The pervious projections can range from about 0.5 inch to about 2 inches in diameter with a diameter of about ¾ inch preferred. A suitable pervious projection is made from a plastic such as acrylonitrile-butadiene-styrene (ABS).

In operation the liquid to be purified, which is preferably water, will be flowed in conduit 17, through valve 40, through distributor 14 and into the first tank 10. The liquid enters through pervious projections 35, 36, and two additional pervious projections. The two additional projections 37 and 38 are not shown in the view of FIG. 2 since this is a cross-sectional view. However this distributor has a construction similar to that of distributor 13. The liquid flows down through the media in the first tank and exits through pervious projections 25, 26, 27 and 28. The liquid then enters the second tank through pervious projections 30, 31, 32 and 33 and flows through the media in the second tank. The liquid now purified exits the second tank through liquid transport conduit 24 and flows upward through distributor conduit 29 in distributor 13 and then through liquid transport conduit 23 to distributor 14. The purified liquid flows through valve 41 and conduit 16 to usage. In backwash the liquid will flow in the opposite direction and clean the media in each tank. In the system shown in FIG. 1, a backwash liquid will enter at conduit 17 and flow via valve 41 through conduit 42 to valve 41. Valve 41 will flow the liquid into tank 10 via the section of conduit 16 between the valve 41 and distributor 14. The liquid then flows down liquid transport conduits 23 and 24 into the second tank. The backwash liquid will flow upwardly through each tank being flowed out of and the into each tank through the pervious projections extending into that tank. The backwash liquid will exit the system through valve 40 and conduit 18. After a suitable backwash the system is put back on purification.

In order to get a high flow rate backwash the pervious projections extending from the distributor 13 into the second tank are of a length of at least preferably about 1.3 to 3 times, and most preferably at least about 2 times the length of the pervious projections extending into the first tank. The pervious projections extending from distributor 14 into the first tank will be about the same to about 3 times the length of those that extend into the first tank from distributor 13. The backwash flow rates that can be achieved with this system range from about 33 percent to about 100 percent of the flow rate of liquid when the system is purifying a liquid.

The length of the pervious projections assumes that the pervious projections are of the same size, i.e., diamete and length. However, they need not be of the same size. In such a case the pervious projections extending into the second tank must have a pervious surface area ratio of preferably at least about 1.3 times, and most preferably at least about 2 times those which extend into the first tank. The ratio of pervious surface area is a primary factor. A greater surface area is needed for the pervious projections extending into a tank with a less dense media. This is the case since on a high flow rate backwash this media will tend to pack around the pervious projections. The larger surface area is needed to maintain the backwash flow rate.

The liquid that will usually be purified is water. In the first tank will usually be a redox (oxidation-reduction) media to remove hydrogen sulfide, iron, manganese, heavy metals such as lead, chlorine and turbidity. In the second tank will be an adsorbent to remove organics, chlorine, iodine, colorants, odorants and trace amounts of heavy metals. A suitable adsorbent for use in the second tank is that which is disclosed in U.S. application Ser. No. 07/503,053 filed Apr. 2, 1990. This application is incorporated herein by reference. However other adsorbents such as activated carbon with or without other components can be used. In the system of FIG. 2, tank 10 contains media 60 which is a redox media and tank 11 contains the adsorbent media 61.

This invention can be practiced in various ways. However, the use of the disclosed or equivalent features to produce a high backwash flow rate will be a use of the disclosed invention.

I claim:

1. A multiple tank filtration system which provides for a high liquid flow during backwash comprising at least two tanks, each of which contains a liquid filtering medium, inlet means to introduce a liquid into a first of said tanks, said tanks interconnected by means of a distributor, said distributor having a plurality of outwardly extending projections having at least a partial pervious surface and extending a first distance into a first tank and a greater second distance into a second tank of said at least two tanks and a liquid transport conduit extending from the disributor to the end of the first tank to an outlet means and from the distributor to adjacent the end of said second tank whereby a liquid is flowed into the inlet means and through said first tank, through the projections of said distributor, then through said second tank, passing through said liquid transport conduit in said second tank and said first tank to said outlet means during a filtering cycle, and in a high flow backwash a liquid is flowed into said outlet means and through said liquid transport conduit, through said second tank, through said projections of said distributor and thence through said first tank prior to exiting therefrom through said inlet means, the flow rate of liquid on backwash being increased by the differing length of the projections of said distributor.

2. A multiple tank filtration system as in claim 1 wherein there are at least four projections extending into said first tank and at least four projections extending into said second tank.

3. A multiple tank filtration system as in claim 1 wherein the surface area of said projections which extend into said second tank to those which extend into said first tank is at least about 1.3 to 1.

4. A multiple tank filtration system as in claim 1 wherein the surface area of said projections which extend into said second tank to those which extend into said first tank is at least about 2 to 1.

5. A multiple tank filtration system as in claim 1 wherein the ratio of the length of said projections which extend into said second tank to those which extend into said first tank is at least about 1.3 to 1.

6. A multiple tank filtration system as in claim 1 wherein the first tank contains an oxidation/reduction media and said second tank contains an adsorption media.

7. A multiple tank filtration system as in claim 1 wherein the liquid transport conduit in said first tank and in said second tank are separate units each sealingly engaged in said distributor.

8. A multiple tank filtration system as in claim 1 wherein said second tank is of a greater volume than said first tank.

9. A multiple tank filtration system as in claim 6 wherein said second tank is of a greater length than said first tank.

10. A multiple tank filtration system which provides for a high liquid flow during backwash comprising at least two tanks, each of which contains a liquid filtering medium, inlet means to introduce a liquid into a first of said tanks, said at least two tanks interconnected by means of a distributor, said distributor having a plurality of outwardly extending projections having at least a partial pervious surface and extending into a first tank and into a second tank of said at least two tanks and a liquid transport conduit extending from the distributor to the end of the first tank to an outlet means and from the distributor to adjacent the end of said second tank whereby a liquid is flowed into the inlet means and through said first tank, through the projections of said distributor, then through said second tank, passing through said liquid transport conduit in said second tank and said first tank to said outlet means during a filtering cycle, and in a high flow backwash a liquid is flowed into said outlet means and through said liquid transport conduit, through said second tank, through said projections of said distributor and thence through said first tank prior to exiting therefrom through said inlet means, the flow rate of liquid on backwash being increased by the differing length of the projections of said distributor.

11. A distributor for flowing a liquid from a first tank into a second tank comprising a collar having a thread section on each end, each threaded section adapted to sealingly engage the opening of a tank, a plurality of projections having at least a partial pervious surface and extending from each threaded section, the projections extending from one threaded section being greater in length than those extend from said second threaded section, and a liquid transport conduit extending from each threaded section and being of a length greater than said projections.

12. A distributor as in claim 11 wherein the projections extending from one threaded section are greater in length by at least about 1.3 times the projections extending from the other threaded section.

13. A distributor as in claim 11 wherein the projections extending from one threaded section are greater in length by at least about 2 times the projections extending from the other threaded section.

14. A distributor as in claim 11 wherein the surface area of the projections extending from one threaded section are greater in surface area at least by about 1.3 times the projections extending from the other threaded section.

15. A distributor as in claim 11 wherein the surface area of the projections extending from one threaded section are greater in surface area by at least about 2 times the projections extending from the other threaded section.

16. A distributor as in claim 11 wherein said liquid transport conduit is sealingly engaged into said distributor.

17. A distributor for flowing a liquid from a first tank into a second tank comprising a collar having a thread section on each end, each threaded section adapted to sealingly engage the opening of a tank, a plurality of projections having at least a partially pervious surface extending from each threaded section, and a liquid transport conduit extending from each threaded section and being of a length greater than said projections.

18. A method of flowing a liquid through a multiple tank liquid filtration system comprising:
 (a) flowing said liquid through an inlet valve into a first tank which contains a substance to remove contaminants from said liquid;
 (b) removing the liquid from said first tank through a plurality of projections having at least a partial pervious surface and on a distributor;
 (c) flowing the liquid into a second tank through a plurality of projections extending from said distributor, said projections on said distributor extending into said second tank being of a greater length than those extending into said first tank;
 (d) removing a liquid decreased in contaminants through a liquid conduit which extends through said first and second tanks; and
 (e) intermittently backflushing said second tank and said first tank by flowing liquid in the reverse direction through said second tank and said first tank at a rate that is at least 33 percent of the rate of flow of liquid during the step of removing contaminants from said liquid.

19. The method as in claim 18 wherein said liquid is water.

20. The method as in claim 19 wherein water is flowed during backflushing at a rate of at least about 50 percent of the flow during the removal of cantaminants.

* * * * *